US011270702B2

(12) United States Patent
Mohapatra

(10) Patent No.: US 11,270,702 B2
(45) Date of Patent: Mar. 8, 2022

(54) SECURE TEXT-TO-VOICE MESSAGING

(71) Applicant: SONY CORPORATION, Tokyo (JP)

(72) Inventor: Bibhudendu Mohapatra, San Diego, CA (US)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 16/706,746

(22) Filed: Dec. 7, 2019

(65) Prior Publication Data
US 2021/0174807 A1 Jun. 10, 2021

(51) Int. Cl.
| G10L 15/00 | (2013.01) |
| G10L 15/26 | (2006.01) |
| G10L 15/22 | (2006.01) |
| H04W 4/12 | (2009.01) |
| G10L 15/30 | (2013.01) |
| H04M 3/533 | (2006.01) |
| G10L 13/027 | (2013.01) |

(52) U.S. Cl.
CPC .......... *G10L 15/26* (2013.01); *G10L 13/027* (2013.01); *G10L 15/22* (2013.01); *G10L 15/30* (2013.01); *H04M 3/53333* (2013.01); *H04W 4/12* (2013.01); *H04M 2201/40* (2013.01); *H04M 2201/60* (2013.01)

(58) Field of Classification Search
CPC ....... G10L 13/027; G10L 13/08; G10L 15/26; G10L 15/22; G10L 15/30; G10L 13/00; H04M 3/53333; H04M 2201/40; H04M 2201/60; H04M 1/72577; H04W 4/12; H04L 67/24; H04L 63/101; G06Q 30/0269; G06Q 10/107; H04R 1/1016

USPC ........................................................ 704/235
See application file for complete search history.

(56) References Cited

U.S. PATENT DOCUMENTS

| 8,224,647 | B2 | 7/2012 | Niemeyer et al. |
| 8,566,407 | B2 * | 10/2013 | Lee ..................... G06Q 10/107 709/206 |
| 9,106,672 | B2 | 8/2015 | Zhang et al. |
| 9,288,597 | B2 | 3/2016 | Carlsson et al. |
| 9,560,449 | B2 | 1/2017 | Carlsson et al. |
| 10,176,798 | B2 | 1/2019 | Gueta et al. |
| 2004/0098266 | A1 * | 5/2004 | Hughes ................. G10L 13/06 704/277 |

(Continued)

FOREIGN PATENT DOCUMENTS

| GB | 2443468 A | 5/2008 | |
| WO | WO-2015095597 A1 * | 6/2015 | ........... H04L 63/101 |

OTHER PUBLICATIONS

Bharthi et al., "Unit selection based speech synthesis for converting short text message into voice message in mobile phones", 2017 International Conference on Advanced Computing and Communication Systems (ICACCS-2017), Jan. 6-7, 2017, Coimbatore, India.

*Primary Examiner* — Md S Elahee
(74) *Attorney, Agent, or Firm* — John L. Rogitz

(57) ABSTRACT

A personal voice model is created using a person's voice, essentially, voice cloning. When user wants to send a message to another person from his mobile phone or similar device, the user types the message and it is converted to a speech message using the voice model created. The speech message is delivered either to a voicemail or another medium which accepts a voice message. The text can be converted to a different language as well and send a voice message in a different language.

18 Claims, 5 Drawing Sheets

(56) References Cited

U.S. PATENT DOCUMENTS

| | | | |
|---|---|---|---|
| 2005/0210394 A1* | 9/2005 | Crandall | H04L 67/24 |
| | | | 715/752 |
| 2009/0228557 A1* | 9/2009 | Ganz | G06Q 10/107 |
| | | | 709/206 |
| 2017/0032426 A1* | 2/2017 | Salvato | G06Q 30/0269 |
| 2020/0105246 A1* | 4/2020 | Brake | G10L 13/08 |

* cited by examiner

300 ↘

SETUP YOUR AUDIBLE MESSENGER ～302

→ SPEAK FREE PHRASE(S) OR ～304
STOCK PHRASE

→ REPEAT ～306

→ SPEAK ANOTHER PHRASE ～308

DONE! ～310

(SETUP)

SELECT AUTHENTICATION ～402

→ FINGERPRINT (PLACE FINGER ON ～404
SCREEN)

→ IMAGE (TAKE OR IMPORT ～406
YOUR PHOTO)

→ PASSWORD _____ ╱408

→ COMBINATION ～410

(SETUP)

FIG. 4

(MESSAGING)

SECURE TEXT-TO-VOICE MESSAGING

FIELD

The present application relates to technically inventive, non-routine solutions that are necessarily rooted in computer technology and that produce concrete technical improvements.

BACKGROUND

People frequently send text messages to each other using their mobile telephones. As understood herein, this is less than optimum for recipients with vision impairments, and for recipients who may prefer a different language. A voice-to-voice messaging system may resolve this, but senders with speech impediments can find this frustrating.

SUMMARY

Present principles recognize that a message input as text can be converted to voice using the sender's own voice, to be delivered to an audio playback device of a recipient either in the sender's or the recipient's language. Present principles further recognize, however, that maintaining a model of a sender's voice that can be used to generate synthesized speech from text poses security challenges, as theft of the model can be used for harmful purposes.

Accordingly, an assembly includes at least one processor and at least one display configured to communicate with the processor. The processor is programmed to access instructions executable by the processor to execute a messaging app for sending messages from a sender to recipients. The instructions are executable to employ the messaging app to receive text input, convert the text input to a voice signal synthesized to be in the sender's voice, and send the voice signal to at least one recipient device for audible playback on the recipient device.

In examples, the instructions can be executable to compare the text message to a list of terms, and based at least in part on the compare, determine whether to convert the text message to the voice signal. The list of terms can include a blacklist, and the instructions can be executable to not convert the text message to the voice signal responsive to the text message containing at least one term on the blacklist. In these examples, the instructions can be executable to, responsive to the text message containing at least one term on the blacklist, present on the assembly a warning. In addition, or alternatively, the instructions can be executable to, responsive to the text message containing at least one term on the blacklist, disable the assembly at least from sending voice signals.

In other examples, the list of terms can include a whitelist, and the instructions can be executable to not convert the text message to the voice signal responsive to any term in the text message containing not being on the whitelist.

In embodiments, the voice signal is generated using a model of the sender's voice, and the model of the sender's voice resides only on the assembly and on no other computing devices. For added security, the instructions may be executable to authenticate a logged-on user prior to employing the messaging app to transmit the voice signal.

In another aspect, a machine-implemented method includes receiving text input at a sender device and determining whether the text input contains a blacklisted term. Responsive to determining that the text input contains a blacklisted term, the method includes locking use of the sender device pending entry of an unlock code, or presenting a warning on the sender device, or both locking use of the sender device pending entry of an unlock code and presenting a warning on the sender device. In contrast, responsive to determining that the text input does not contain a blacklisted term, the method converts the text input to a voice signal and sending the voice signal to at least one recipient device.

In another aspect, a device includes at least one computer storage that is not a transitory signal and that in turn includes instructions executable by at least one processor to receive text input and identify whether the text input contains at least one blacklisted term. Responsive to the text input containing at least one blacklisted term, the instructions are executable lock use of a sender device into which the text input was entered, or present a warning on the sender device, or both lock use of the sender device and present a warning on the sender device. On the other hand, responsive to the text input not containing at least one blacklisted term, the instructions are executable to convert the text input to a voice signal using a model of a voice of a sender associated with the sender device, and transmit the voice signal to a recipient device.

The details of the present disclosure, both as to its structure and operation, can be best understood in reference to the accompanying drawings, in which like reference numerals refer to like parts, and in which:

BRIEF DESCRIPTION OF THE DRAWINGS

FIGS. 3-6 are screen shots of example user interfaces (UIs) to set up security measures for the sender's voice model.

DETAILED DESCRIPTION

Figure 1:
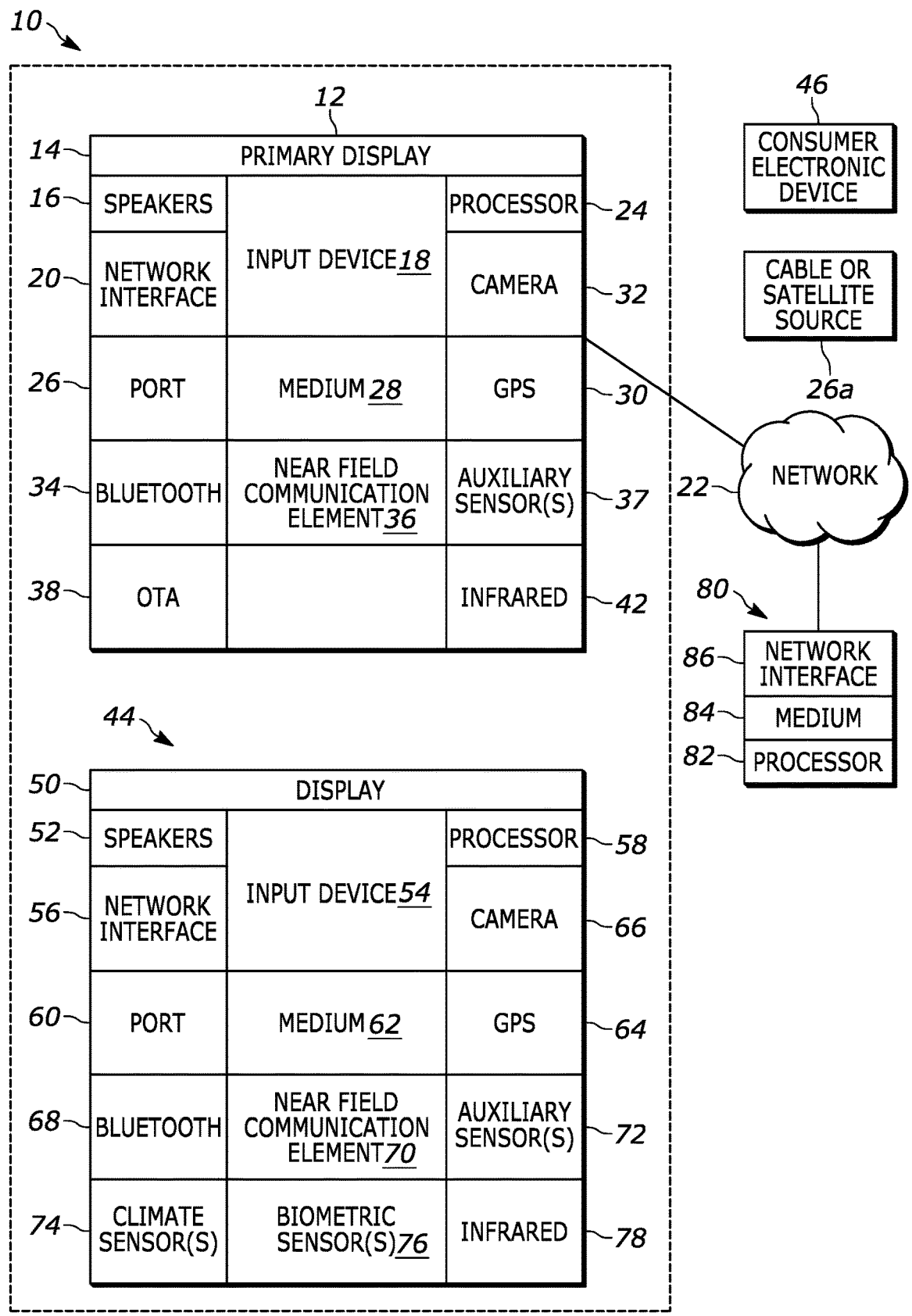
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft or Unix or Apple, Inc. or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as, e.g., a computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as a keyboard or keypad or an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to send messages to a second CE device 46 may include similar components as the first CE device 44 and hence will not be discussed in detail. In the example shown, only two CE devices 44, 46 are shown, it being understood that fewer or greater devices may be used.

The example non-limiting first CE device 44 may be established by any one of the above-mentioned devices, for example, a portable wireless laptop computer or tablet computer or notebook computer or mobile telephone, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as a keypad or keyboard or audio receiver/microphone for entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (for instance, using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a web cam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

At least one server 80 may include at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud"

functions such that the devices of the system 10 may access a "cloud" environment via the server 80 in example embodiments. Or, the server 80 may be implemented by a game console or other computer in the same room as the other devices shown in FIG. 1 or nearby.

Now referring to FIG. 2, commencing at block 200 a user seeking to send a message ("sender") to the device of a recipient is authenticated as described further below. The sender device and recipient device may be established by the CE devices 44, 46 respectively. Note that this authentication can be in addition to an initial computer log on. For example, the authentication at block 200 may be required every time a messaging application ("app") is opened to input a message to a recipient.

Moving to block 202, upon successful authentication a message user interface (UI) is presented on a display of the device of the sender. An example message UI is described further below. The message UI enables the sender to enter at block 204 not only the recipient device address (typically from a contact list or input directly) but also text input of the message sought to be conveyed and the language for the text message, once converted to voice, ultimately to be played back in.

If desired, the logic may move from block 204 to block 206, in which a machine learning model is executed to predict an emotion or sentiment of the text input at block 204. For example, based on the content of the text, the machine learning model may output an emotion indication of happy, or sad, excitement, joy, fun, peacefulness, etc. Without limitation and by way of example only, an example technique for the step at block 206 is presented in Alm et al., "Emotions from Text: Machine Learning for Text-Based Emotional Prediction", *Proceedings of Human Language Technology Conference and Conference on Empirical Methods in Natural Language Processing*, pages 579-586, Association for Computational Linguistics, 2005, incorporated herein by reference and disclosed in the instant file history.

From block 206 the logic may move to block 208 to convert the text to speech in the user-desired language discussed elsewhere herein. In the example shown, the logic may flow from block 208 to decision diamond 210 to determine whether any word or term or phrase is on a blacklist that the sender can have previously established according to disclosure below or that may be established by the author of the app or other entity. This is a security feature in the event that the sender's device is lost, stolen, or otherwise compromised and sought to be used for nefarious purposes by a hacker texting in problematic messages to be delivered in the sender's voice, impersonating the sender for ill purposes. This feature also saves the sender from unwittingly sending an embarrassing message owing to a mis-typed text input.

If the text message is found to contain a blacklisted term, the logic can move to block 212 to either present a prompt on the sender's device to change the input message, or to disable the sender device altogether pending input of a correct code such as a personal identification number (PIN). The logic may then loop back to block 202 to present the message UI again, assuming that the PIN is properly entered in examples that disable the device upon detection of a blacklisted term.

However, if the message contains no blacklisted terms, the logic may move to block 214 in which the speech signal is synthesized to be in the sender's voice using tonality and other emotion information from block 216, which is derived from the step at block 206. Additionally, if desired ambient audio from sound in the user's vicinity may be captured at block 218 and mixed with the speech from block 214 at block 220 for a more realistic effect. At block 222 the voice message is sent to the recipient's device in the sender-designated language. In this latter regard, if the designated language is different than the language of the input text message, the input text message may first be converted to text in the designated language and then converted to a voice signal.

At this point it should be noted that in lieu of a blacklist of forbidden terms at decision diamond 210, a more restrictive and hence more secure whitelist test may be employed in which the input text message is examined and passed to block 214 only if all terms in the text message are on the whitelist, with any term not on the whitelist resulting in the logic moving to block 212.

It may also be noted that the step at block 214 and in other blocks may be executed by a server communicating with the sender and recipient devices and having access to the sender's voice model or by the recipient device, but more preferably for security reasons is executed locally by the sender device. In this way the sender's voice model is not disseminated onto a network, further reducing the risk of a data breach that could expose the sender's voice model to unauthorized use by hackers.

In translating the text to a voice message in the sender's voice, a neural network such as but not limited to Adobe Voco or DeepMind® WaveNet from Google may be used. These neural networks acquire voice samples from the sender as a training set to train the neural networks to generate sound-alike voice with phonemes derived from the input text message that were not present in the training set.

FIGS. 3-6 illustrate example setup UIs that may be employed. A UI 300 in FIG. 3 includes a prompt 302 for the user to set up the messenger app by training a neural network hosted by the sender device on the sending user's voice. A prompt 304 may appear for the user to speak any phrase desired or to speak stock phrases which may be presented on the display and read by the user. If the spoken input is unclear or otherwise insufficient, the user may be prompted to repeat at 306. Also, if further data is needed for the training set, the user may be prompted at 308 to speak another phrase. Once the neural network has acquired sufficient training data, it is trained to produce voice output based on text input, and a "done" indicator 310 may be presented.

Figure 2:
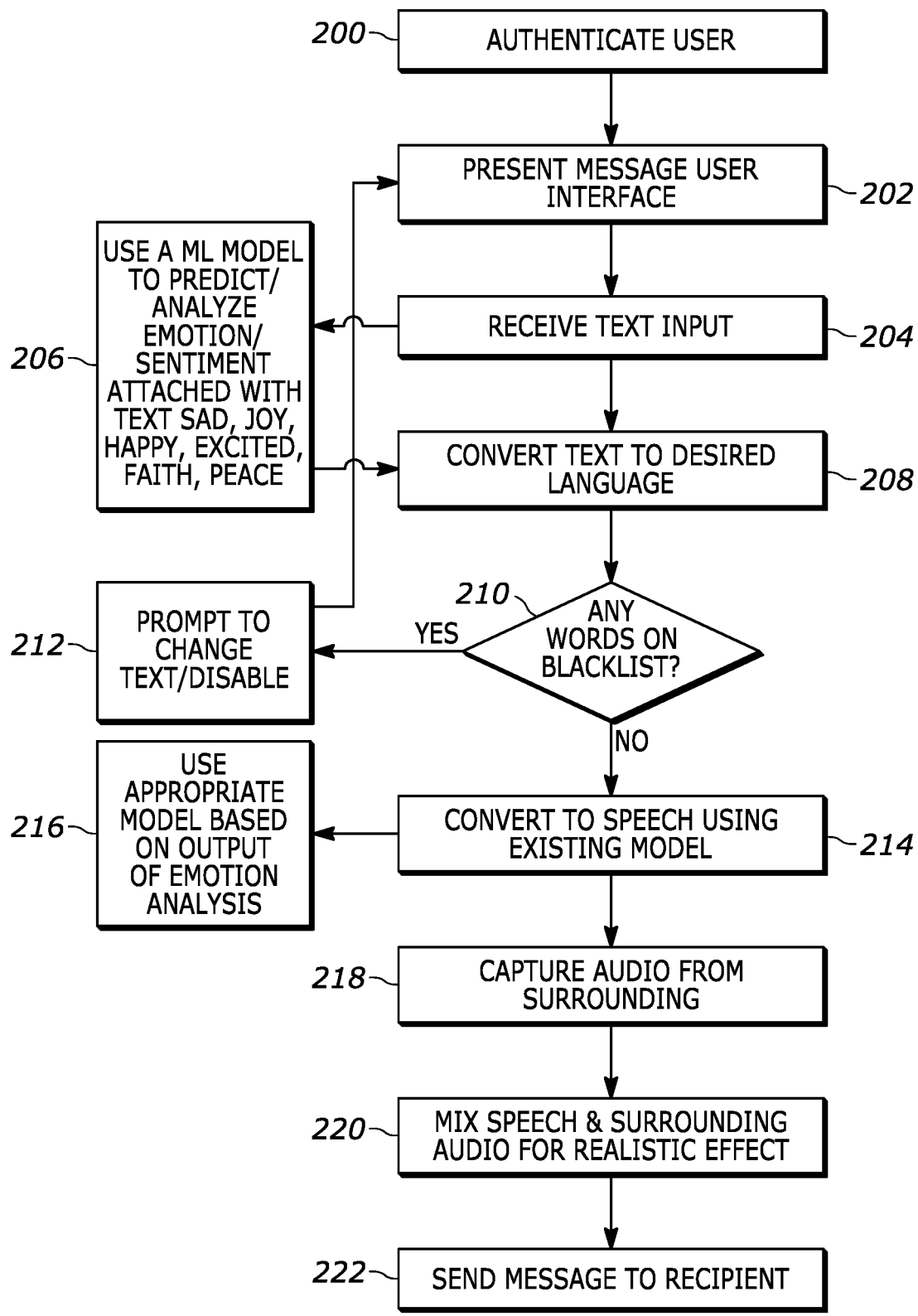
FIG. 2 is a flow chart of example overall logic consistent with present principles.

FIG. 4 illustrates a UI 400 that can be used to set up authentication used at block 200 in FIG. 2. A prompt 402 may be presented for the user to select a desired authentication technique. The user may select at 404 to use fingerprint authentication and may be prompted to place his finger on the touch display to input the template against which future fingerprints for authentication will be tested. The user may select at 406 to use face recognition authentication and may be prompted to take his photo or import his photo to input the template against which future images for authentication will be tested. The user may select at 408 to use password authentication and may be prompted to enter a password to input the template against which future passwords for authentication will be tested. The user may select at 410 a combination of the above example techniques for multi-factor authentication. Key fob techniques also may be used in which a keying electronic device such as a fob must be within NFC distance of the sender device for authentication to be enabled.

Figure 5:
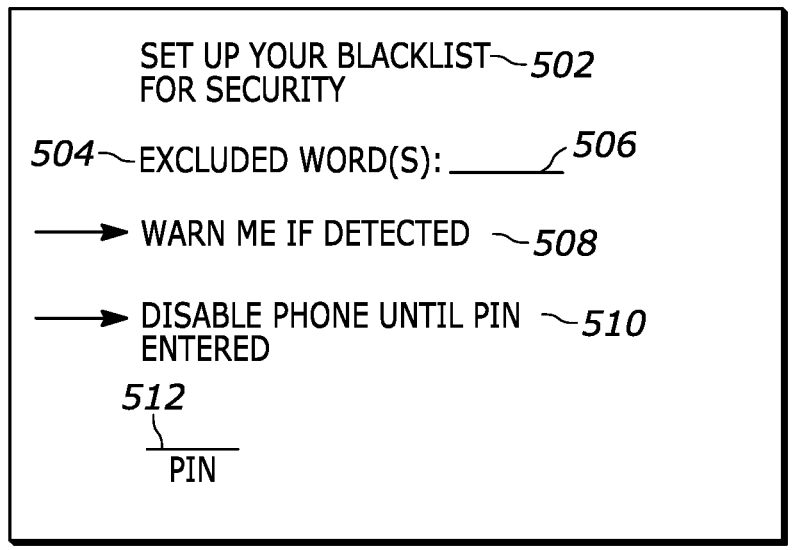

FIG. 5 illustrates a blacklist setup for use at decision diamond 206 in FIG. 2. This feature recognizes that in personal text communication between friends, certain terms or topics probably are seldom if ever used or discussed, but a hacker of a compromised sender device might seek to use such terms or topics to embarrass the sender by making it seem that the sender has spoken something he has not. For example, the sender may anticipate never using racial epithets or vulgar terms in text messages, or never to text discussions of certain political issues or personalities, and so names of political or religious or cultural topics or personalities may be entered into the blacklist.

The UI 500 may include a prompt 502 to set up the blacklist for security. A prompt 504 may be presented for the user to enter excluded terms into the blacklist in a field 506. Also, the user may be enabled to select a selector 508 to be warned if any text is detected to contain a term on the blacklist. The user also may be enabled to select a selector 510 to disable the sender device upon detection of a blacklisted term in input text until a code such as a PIN is entered. A PIN may be entered into a field 512 to be used as a template compare subsequently entered PINs against to unlock the sender device after detection of a blacklisted term.

Figure 6:
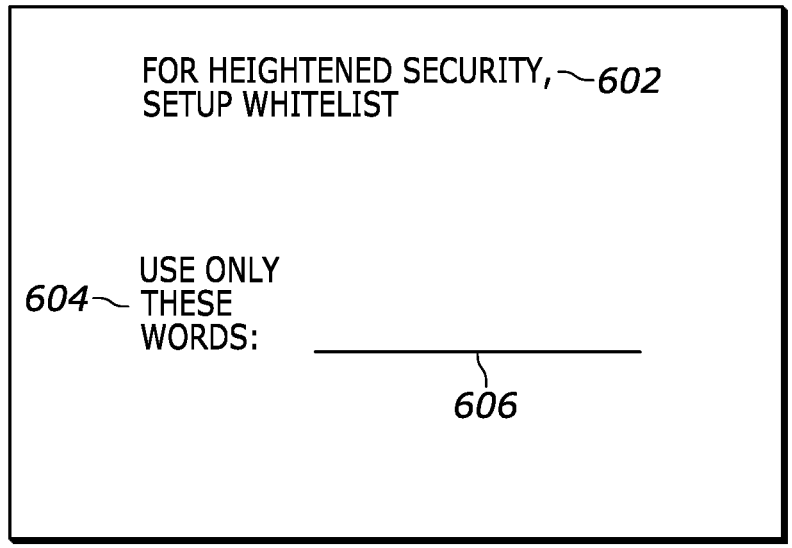

FIG. 6 illustrates a UI 600 prompting a user at 602 to establish the above-discussed alternative whitelist. A prompt 604 may be presented for the user to enter terms into a field 606 of whitelisted terms. As discussed above, text input is compared and rejected unless it includes only whitelisted terms.

Figure 7:
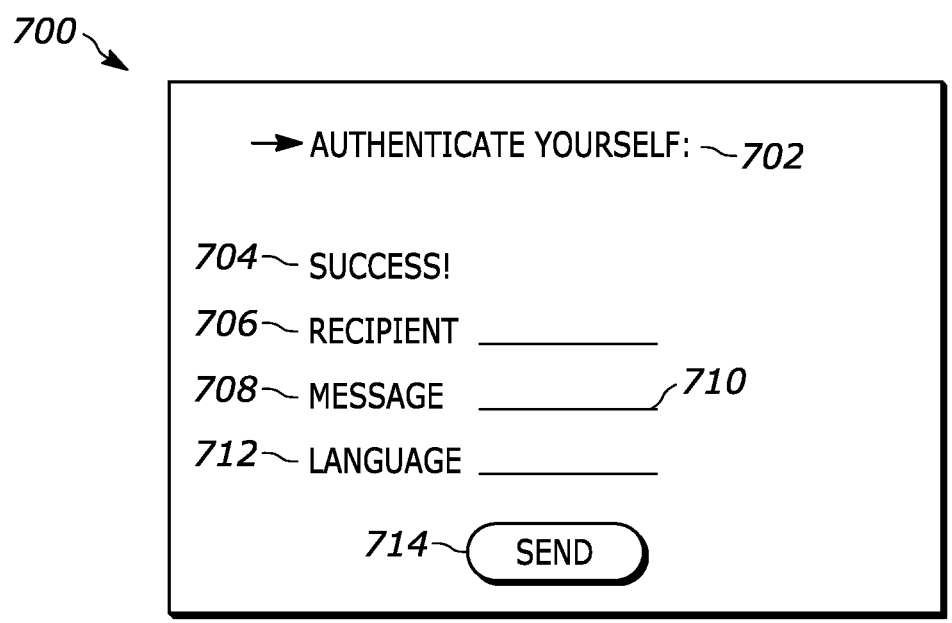
FIG. 7 is a screen shot of an example UI to input text and have it sent as a voice message in the sender's voice to a recipient.

FIG. 7 illustrates a post-setup operational UI 700 to enable a user to input a text message and have it delivered to a recipient as a voice message in the sender's voice. The user first may be prompted at 702 to authenticate himself using the selected authentication technique(s) from FIG. 4. An indication 704 may be presented upon successful authentication. A user may then enter the recipient address at 706 and respond to a prompt 708 to enter the desired text message into a field 710. The user may also select a language at 712, if different than the language of the input text, he would like his message to be delivered, and then select a send selector 714. The text message is first translated to the selected different language, if any, then converted to a voice signal in the sender's voice by the neural network and transmitted to the recipient address.

While particular techniques are herein shown and described in detail, it is to be understood that the subject matter which is encompassed by the present application is limited only by the claims.

What is claimed is:

1. An assembly, comprising:
at least one processor;
at least one display configured to communicate with the processor;
the processor being programmed to:
execute a messaging app for sending messages from a sender device to recipient devices, the instructions being executable to employ the messaging app to:
receive text input at the sender device from a sender;
responsive to the text input containing a blacklisted term, locking use of the sender device for executing the messaging app pending entry of an unlock code, and otherwise send a voice signal converted from the text input and synthesized to be in the sender's voice to at least one recipient device for audible playback on the recipient device.

2. The assembly of claim 1, wherein the processor is programmed to:
compare the text input to a list of terms; and
based at least in part on the compare, determine whether to convert the text input to the voice signal.

3. The assembly of claim 2, wherein the list of terms comprises a blacklist, and the processor is programmed to not convert the text input to the voice signal responsive to the text input containing at least one term on the blacklist.

4. The assembly of claim 3, wherein the processor is programmed to, responsive to the text input containing at least one term on the blacklist, present on the assembly a warning.

5. The assembly of claim 3, wherein the processor is programmed to, responsive to the text input containing at least one term on the blacklist, disable the assembly at least from sending voice signals pending input of a correct code.

6. The assembly of claim 2, wherein the list of terms comprises a whitelist, and the processor is programmed to not convert the text input to the voice signal responsive to any term in the text input containing not being on the whitelist.

7. The assembly of claim 1, wherein the voice signal is generated using a model of the sender's voice, and the model of the sender's voice resides only on the assembly and on no other computing devices.

8. The assembly of claim 1, wherein the processor is programmed to:
authenticate a logged-on user responsive to opening the messaging app prior to employing the messaging app to transmit the voice signal.

9. A machine-implemented method comprising:
receiving text input at a sender device from a sender;
determining whether the text input contains a blacklisted term;
responsive to determining that the text input contains a blacklisted term, locking use of the sender device pending entry of an unlock code; and
responsive to determining that the text input does not contain a blacklisted term, converting the text input to a voice signal and sending the voice signal to at least one recipient device.

10. The assembly of claim 1, wherein the processor is programmed to:
send the voice signal along with ambient audio from sound in the sender's vicinity mixed with the voice signal.

11. The method of claim 9, comprising:
responsive to determining that the text input contains a blacklisted term, presenting a warning on the sender device.

12. The method of claim 9, comprising:
converting the text input to the voice signal using a model of the voice of the sender.

13. A sender device comprising:
at least one computer storage that is not a transitory signal and that comprises instructions executable by at least one processor to:
receive text input from a sender associated with the sender device;
identify whether the text input contains at least one blacklisted term;
responsive to the text input containing at least one blacklisted term, lock use of the sender device into which the text input was entered pending entry of an unlock code;
responsive to the text input not containing at least one blacklisted term, convert the text input to a voice signal using a model of a voice of the sender associated with the sender device; and
transmit the voice signal to a recipient device.

14. The device of claim 13, wherein the instructions are executable to:
  unlock use of the sender device after locking use upon receipt of a valid code.

15. The device of claim 13, wherein the instructions are executable to:
  responsive to the text input containing at least one black-listed term, present a warning on the sender device.

16. The device of claim 13, wherein the model resides only on the sender device and on no other computing devices.

17. The device of claim 13, wherein the instructions are executable to:
  authenticate a logged-on user responsive to opening an app to receive the text input prior to transmitting the voice signal.

18. The device of claim 13, comprising the at least one processor, the at least one processor and the computer storage being in the sender device.

\* \* \* \* \*